United States Patent
Gane et al.

(10) Patent No.: US 9,593,244 B2
(45) Date of Patent: *Mar. 14, 2017

(54) PROCESS TO PREPARE A SURFACE-REACTED CALCIUM CARBONATE IMPLEMENTING A WEAK ACID, RESULTING PRODUCTS AND USES THEREOF

(71) Applicant: Omya International AG, Oftringen (CH)

(72) Inventors: Patrick A. C. Gane, Rothrist (CH); Daniel E. Gerard, Basel (CH)

(73) Assignee: Omya International AG, Oftringen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/685,885

(22) Filed: Apr. 14, 2015

(65) Prior Publication Data

US 2015/0225568 A1 Aug. 13, 2015

Related U.S. Application Data

(63) Continuation of application No. 13/378,171, filed as application No. PCT/IB2010/052666 on Jun. 15, 2010, now Pat. No. 9,096,761.

(60) Provisional application No. 61/269,243, filed on Jun. 22, 2009.

(30) Foreign Application Priority Data

Jun. 15, 2009 (EP) ..................... 09162727

(51) Int. Cl.
| | | |
|---|---|---|
| *C08K 3/26* | (2006.01) | |
| *C08K 9/00* | (2006.01) | |
| *C09C 1/02* | (2006.01) | |
| *D21H 17/67* | (2006.01) | |
| *C09D 7/12* | (2006.01) | |
| *C02F 1/68* | (2006.01) | |
| *C08K 9/04* | (2006.01) | |
| *D21H 17/14* | (2006.01) | |
| *D21H 17/69* | (2006.01) | |

(52) U.S. Cl.
CPC ............... *C09C 1/021* (2013.01); *C02F 1/68* (2013.01); *C08K 3/26* (2013.01); *C08K 9/00* (2013.01); *C08K 9/04* (2013.01); *C09C 1/022* (2013.01); *C09D 7/1225* (2013.01); *D21H 17/14* (2013.01); *D21H 17/67* (2013.01); *D21H 17/675* (2013.01); *C01P 2004/61* (2013.01); *C01P 2004/80* (2013.01); *C01P 2006/12* (2013.01); *C08K 2003/265* (2013.01); *D21H 17/69* (2013.01)

(58) Field of Classification Search
CPC ...... D21H 17/69; D21H 19/385; C09C 1/021; C09C 1/022; C08K 3/26; C08K 9/00; C09D 7/1225
See application file for complete search history.

(56) References Cited

U.S. PATENT DOCUMENTS

| | | | |
|---|---|---|---|
| 4,659,385 A * | 4/1987 | Costopoulos ........... C04B 26/04 | |
| | | | 106/673 |
| 5,164,006 A | 11/1992 | Chapnerkar et al. | |
| 6,083,317 A * | 7/2000 | Snowden ................ C09C 1/024 | |
| | | | 106/464 |
| 6,228,161 B1 | 5/2001 | Drummond | |
| 6,666,953 B1 * | 12/2003 | Gane .................... D21H 19/385 | |
| | | | 106/464 |
| 7,033,428 B2 | 4/2006 | Drummond | |
| 9,096,761 B2 * | 8/2015 | Gane ..................... D21H 17/14 | |
| 2002/0148582 A1 | 10/2002 | Drummond | |
| 2010/0298480 A1 * | 11/2010 | Jacquemet .......... B01F 17/0007 | |
| | | | 524/427 |
| 2012/0186492 A1 | 7/2012 | Gane et al. | |

FOREIGN PATENT DOCUMENTS

| | | | |
|---|---|---|---|
| EP | 0445952 A1 | 9/1991 | |
| EP | 2070991 A | 6/2009 | |
| FR | 2787802 A | 6/2000 | |
| FR | 2852600 A | 9/2004 | |
| RU | 2179607 C2 | 2/2002 | |
| SU | 1198001 A | 12/1985 | |
| WO | 9820079 A1 | 5/1998 | |
| WO | 2005121257 A | 12/2005 | |
| WO | WO 2009/040616 * | 4/2009 | ............... C09C 1/02 |

OTHER PUBLICATIONS

Office Action dated Jan. 14, 2013 for Chinese Application No. 201080034262.X.
Office Action for Columbian Application No. 12-3645-6.
Office Action dated Aug. 20, 2013 for Japanese Application No. 2012-515610.
Office Action dated Sep. 17, 2013 for Korean Application No. 10-2012-7000977.
Decision on Grant for Russian Application No. 2012101307.
International Search Report dated Aug. 12, 2010 for PCT Application No. PCT/IB2010/052666.

* cited by examiner

*Primary Examiner* — Pegah Parvini
(74) *Attorney, Agent, or Firm* — Amster, Rothstein & Ebenstein LLP

(57) ABSTRACT

The present application relates to a process for preparing a surface-reacted calcium carbonate in an aqueous environment. The process according to the present invention aims at avoiding the mandatory implementation of medium-strong to strong acids. Another aspect of the present invention is directed to an aqueous suspension of surface-reacted calcium carbonate which is obtainable by the inventive process.

37 Claims, No Drawings

PROCESS TO PREPARE A SURFACE-REACTED CALCIUM CARBONATE IMPLEMENTING A WEAK ACID, RESULTING PRODUCTS AND USES THEREOF

CROSS-REFERENCE TO RELATED APPLICATIONS

This is a continuation of U.S. application Ser. No. 13/378,171, filed Jan. 17, 2012, which is a U.S. National phase of PCT Application No. PCT/IB2010/052666, filed Jun. 15, 2010, which claims priority to European Application No. 09162727.3, filed Jun. 15, 2009 and U.S. Provisional Application No. 61/269,243, filed Jun. 22, 2009, the contents of which are hereby incorporated by reference.

The present invention concerns the technical field of surface-reacted calcium carbonate products based on ground natural calcium carbonate (GNCC).

In practice, calcium carbonate is used in large quantities in the paper, paint, rubber and plastics industries for various purposes such as coatings, fillers, extenders and pigments for papermaking as well as aqueous lacquers and paints and in water treatment, and notably as a means of removing inorganic materials such as heavy metals and/or pharmaceutical waste such as polycyclic compounds, cholesterol and/or endocrine disrupting compounds (EDC).

In the past decade, a new class of calcium carbonate derivatives referred to as "surface-reacted calcium carbonate" has been developed and provides a number of advantageous properties on application.

A "surface-reacted calcium carbonate" is a material comprising calcium carbonate and an insoluble, at least partially crystalline, non-carbonate calcium salt extending from the surface of at least part of the calcium carbonate. The calcium ions forming said at least partially crystalline non-carbonate calcium salt originate largely from the starting calcium carbonate material that also serves to form the surface-reacted calcium carbonate core.

In the art, several approaches for preparing such surface-reacted calcium carbonate products have been proposed.

U.S. Pat. No. 6,666,953 B1 relates to a pigment, filler or mineral containing a natural calcium carbonate, treated with one or more providers of $H_3O^+$ ions having a pKa of less than 2.5 and gaseous $CO_2$, allowing a reduction in the weight of paper for a constant surface area without loss of physical properties when it is used as a pigment or coating filler for said paper.

Variant WO 2005/121257 A2 discloses a method for producing a dry mineral pigment characterised in that it contains a product formed in situ by the multiple reaction of a calcium carbonate with a medium-strong to strong acid and with gaseous $CO_2$ formed in situ and/or from an external supply, along with at least one compound of formula R—X.

Likewise, WO 2004/083316 A1 refers to mineral pigments containing a product formed in situ by the double and/or multiple reaction between a calcium carbonate and the reaction product or products of the said carbonate with one or more moderately strong to strong $H_3O^+$ ion donors and the reaction product or products of the said carbonate with gaseous $CO_2$ formed in situ and/or coming from an external supply, and at least one aluminium silicate and/or at least one synthetic silica and/or at least one calcium silicate and/or at least one silicate of a monovalent salt such as sodium silicate and/or potassium silicate and/or lithium silicate, preferably such as sodium silicate and/or at least one aluminium hydroxide and/or at least one sodium and/or potassium aluminate, used in papermaking applications, such as mass filling and/or paper coating.

The above technologies are of particular interest to the skilled man as they provide a means of structuring the surface and significantly increasing the specific surface area of the GNCC starting material by controlled deposition of an at least partially crystalline calcium salt thereon, and such that the calcium source for this deposited material is the GNCC mineral itself.

However, each involves the use of medium-strong to strong acids characterised by a pKa of less than 2.5 when measured at 20° C. Many of the acids listed as useful medium-strong to strong acids are mineral acids, and preferred acids include notably phosphoric acid.

Firstly, the skilled man remains constantly interested in new processes to prepare surface-reacted calcium carbonate materials implementing alternative adducts, given that the availability and price of a given adduct are subject to change over time, including unexpected changes that the skilled man must plan for.

Secondly, with regards the occupational exposure limits established by a cooperation between the International Programme on Chemical Safety and the European Commission, and notably according to the International Chemical Safety Card (ICSC) of phosphoric acid published by the International Occupational Safety and Health Information Centre (CIS), this acid is associated with a very low threshold limit value (TLV) corresponding to less than 1 ppm as a time weighted average (TWA). This implies that particular and often onerous precautions are to be taken when implementing this acid, notably on the industrial scale. The skilled man is moreover aware of the risk that regulations covering such low TLV substance become more stringent over time, potentially rendering their employment impracticable.

Faced with the above, the Applicant has surprisingly found a process to prepare a surface-reacted calcium carbonate having comparable specific surface area development potential to surface-reacted calcium carbonate prepared according to U.S. Pat. No. 6,666,953 B1, but avoiding the mandatory implementation of medium-strong to strong acids such as phosphoric acid.

This inventive process resides in a particular, unexpected selection of adducts, dosed according to a specific order of steps.

Namely, this process for preparing a surface-reacted calcium carbonate in an aqueous environment comprises the following steps:

a) providing at least one ground natural calcium carbonate (GNCC);
b) providing at least one water-soluble acid;
c) providing gaseous $CO_2$;
d) contacting said GNCC of step a) with said acid of step b) and with said $CO_2$ of step c);

characterised in that:

(i) said acid(s) of step b) each having a $pK_a$ of greater than 2.5 and less than or equal to 7, when measured at 20° C., associated with the ionisation of their first available hydrogen, and a corresponding anion formed on loss of this first available hydrogen capable of forming water-soluble calcium salts;

(ii) following contacting said acid(s) with said GNCC, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided.

When the prior art makes reference to contacting calcium carbonate with a weak acid, it is in view of an entirely different goal and according to processes that differ fundamentally from the process of the present invention.

Notably, U.S. Pat. No. 5,584,923, U.S. Pat. No. 5,647,902, U.S. Pat. No. 5,711,799, WO 97/08247 A1 and WO 98/20079 A1, respectively, describe calcium carbonates which are made acid-resistant to enable their use as a filler material in the making of neutral to weakly acidic paper, and a process for producing such acid-resistant calcium carbonates. The Applicant would point out that acid resistance is entirely in contradiction to the goal of the present invention, wherein the process implements acid to act upon and liberate calcium ions from GNCC, which thereafter serve in the development of surface area.

U.S. Pat. No. 5,043,017 likewise relates to calcium carbonate, acid-stabilized by the addition of one of a calcium-chelating agent and a conjugate base, such as sodium hexametaphosphate, followed by the addition of an acid, which may be a weak acid. Not only does this document refer, as above, to the goal of forming acid-resistant calcium carbonate, but moreover underlines the importance of feeding the calcium-chelating agent or conjugate base to the calcium carbonate before the weak acid.

WO 99/02608 A1 describes a method of producing a high solids slurry of an acid-resistant precipitated calcium carbonate, wherein a solids slurry is treated with a chemical additive, such as sodium aluminate, in order to impart acid resistance to the calcium carbonate.

For completeness, the Applicant would like to mention unpublished European patent application having filing number 07 123 077.5, which relates to a process to prepare a surface-reacted calcium carbonate based on PCC.

The prior art thus seems to be silent on economic methods for preparing high surface area surface-reacted calcium carbonate materials based on GNCC while avoiding the implementation of medium-strong to strong acids having a $pK_a$ of less than 2.5 as measured at 20° C., such as phosphoric acid.

The present invention aims at providing such a process for preparing surface-reacted calcium carbonate as described in the present Application and defined in the claims.

Accordingly, one object of the present application is a process for preparing a surface-reacted calcium carbonate in an aqueous environment comprising the following steps:
a) providing at least one ground natural calcium carbonate (GNCC);
b) providing at least one water-soluble acid;
c) providing gaseous $CO_2$;
d) contacting said GNCC of step a) with said acid of step b) and with said $CO_2$ of step c);
characterised in that:
  (i) said acid(s) of step b) each having a $pK_a$ of greater than 2.5 and less than or equal to 7, when measured at 20° C., associated with the ionisation of their first available hydrogen, and a corresponding anion formed on loss of this first available hydrogen capable of forming water-soluble calcium salts;
  (ii) following contacting said acid(s) with said GNCC, at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided.

"Ground natural calcium carbonate" (GNCC) in the meaning of the present invention is a calcium carbonate obtained from natural sources, marble, chalk or limestone, and processed through a treatment such as grinding, with or without grinding aids, screening and/or fractionizing wet and/or dry, for example by a cyclone.

For the purpose of the present application, "water-insoluble" materials are defined as materials which, when mixed with deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate. "Water-soluble" materials are defined as materials leading to the recovery of greater than 0.1 g of recovered solid material following evaporation at 95 to 100° C. of 100 g of said liquid filtrate.

An "acid" in the meaning of the present invention is defined as a Bronsted-Lowry acid, that is to say, it is an $H_3O^+$ ion-provider. An "acid salt" is defined as a hydrogen-containing salt that is partially neutralised by an electropositive element other than hydrogen. A "salt" is defined as an electrically neutral ionic compound formed of anions and cations.

For the purpose of the present application, $pK_a$ is the symbol representing the acid dissociation constant associated with a given ionisable hydrogen in a given acid, and is indicative of the natural degree of dissociation of this hydrogen from this acid at equilibrium in water at a given temperature. Such pKa values may be found in reference textbooks such as Harris, D. C. "Quantitative Chemical Analysis: $3^{rd}$ Edition", 1991, W.H. Freeman & Co. (USA), ISBN 0-7167-2170-8.

In accordance with the present invention, a "surface-reacted calcium carbonate" is a material comprising calcium carbonate and an insoluble, at least partially crystalline, calcium salt of one or more anions of said water-soluble salt under (ii) above. In a preferred embodiment, the insoluble calcium salt extends from the surface of at least part of the calcium carbonate. The calcium ions forming said at least partially crystalline calcium salt of said anion originate largely from the starting calcium carbonate material. Such salts may include OH— anions and/or crystal water.

Preferred Embodiments Relative to Step a)

In step a) of the process of the present invention, at least one ground natural calcium carbonate (GNCC) is provided.

Preferably, said GNCC is selected from the group consisting of marble, chalk, calcite, dolomite, limestone and mixtures thereof.

In a preferred embodiment, said GNCC of step a) has a weight median diameter of 0.01 to 10 μm, and more preferably of 0.5 to 2 μm, as measured according to the measurement method provided in the Examples section here below.

In another preferred embodiment, GNCC is provided in the form of an aqueous GNCC suspension.

In this preferred embodiment, said suspension has a pH of less than 11, and more preferably of less than 10.5, as measured according to the measurement method described in the Examples section here below.

Preferably, the aqueous calcium carbonate suspension has a solids content of greater than or equal to 10 wt.-% and more preferably of between 10 wt.-% and 80 wt.-%, based on the weight of the suspension. The applicant would remark that in the case of very high solids contents, it is a requirement to have sufficient water for the reactions during and subsequent to step d) to occur. More preferably, the aqueous calcium carbonate suspension has a solid content in the range of 16 wt.-% to 60 wt.-%, and even more preferably in the range of 16 wt.-% to 40 wt.-%, based on the weight of the suspension.

The suspension may moreover be stabilized by the addition of dispersants. Conventional dispersants known to the skilled person can be used. The dispersant can be anionic, cationic or non-ionic. A preferred dispersant is polyacrylic acid.

Preferred Embodiments Relative to Step b)

Step b) of the process of the present invention refers to providing at least one water-soluble acid. Said acid(s) each have a $pK_a$ of greater than 2.5 and less than or equal to 7, when measured at 20° C., associated with the ionisation of their first available hydrogen, and a corresponding anion formed on loss of this first available hydrogen capable of forming water-soluble calcium salts.

In a preferred embodiment, said water-soluble acid(s) have a pKa of between 2.6 and 5.

In a more preferred embodiment, said water-soluble acid(s) are selected from the group consisting of acetic acid, formic acid, propanoic acid and mixtures thereof. In an even more preferred embodiment, said water-soluble acid(s) are selected from the group consisting of acetic acid, formic acid and mixtures thereof. In a most preferred embodiment, said water-soluble acid is acetic acid.

Said water-soluble acid(s) of step b) are preferably dosed in a total amount corresponding to at least $1.5 \times 10^{-4}$ mol of hydrogen atoms in the acid/m² GNCC provided in step a), more preferably in a total amount correspond to from $2 \times 10^{-4}$ to $12 \times 10^{-4}$ mol of hydrogen atoms in the acid/m² GNCC provided in step a), and most preferably from $3 \times 10^{-4}$ to $10 \times 10^{-4}$ mol of hydrogen atoms in the acid/m² GNCC provided in step a).

If the water-soluble salt contacted with said GNCC comprises one or more hydrogen atoms, the water-soluble acid of step b) may be dosed in a lesser amount taking into account the equivalent mol hydrogen atoms of the salt—calculated assuming full dissociation of the hydrogen ion, regardless of actual pKa associated with the hydrogen atoms of the salt. In such a case the water-soluble acid will be dosed in an amount such that the total equivalent mols of hydrogen atoms, based on the water-soluble acid and on the hydrogen-containing salt, corresponds to at least $1.5 \times 10^{-4}$ mol of hydrogen atoms in the acid/m² GNCC provided in step a), more preferably in a total amount correspond to from $2 \times 10$ to $12 \times 10^{-4}$ mol of hydrogen atoms in the acid/m² GNCC provided in step a), and most preferably from $3 \times 10^{-4}$ to $10 \times 10^{-4}$ mol of hydrogen atoms in the acid/m² GNCC provided in step a).

Alternatively, said water-soluble acid(s) of step b) are preferably dosed in a total amount corresponding to 5 to 40 wt.-% equivalent pure acid based on the dry weight of GNCC provided in step a), more preferably in a total amount corresponding to 10 to 30 wt.-% equivalent pure acid based on the dry weight of GNCC provided in step a), and most preferably in a total amount corresponding to 15 to 25 wt.-% equivalent pure acid based on the dry weight of GNCC provided in step a).

Said water-soluble acid(s) of step b) are preferably provided in the form of an aqueous solution having an acid concentration, determined as the equivalent weight of pure acid on the weight of the total solution, corresponding to from 25 to 75%, and more preferably to from 40 to 60%.

Preferred Embodiments Relative to Step c)

According to step c) of the process of the present invention, gaseous $CO_2$ is provided.

The required carbon dioxide may be formed in situ from the carbonate as a result of contacting the acid with GNCC. Alternatively or additionally, the carbon dioxide can be supplied from an external source.

Preferably, the concentration of gaseous carbon dioxide in the aqueous suspension throughout the reaction is, in terms of volume, such that the ratio (volume of suspension): (volume of gaseous $CO_2$) is from 1:0.05 to 1:20, even more preferably 1:0.05 to 1:5.

Preferred Embodiments Relative to Step d)

Step d) of the process of the present invention refers to contacting said GNCC of step a) with said acid of step b) and with said $CO_2$ of step c).

It is preferred that said acid(s) be added, in one or more steps, to said GNCC.

In the case where said GNCC is added to said acid(s), it is necessary to proceed adding a fraction of said GNCC to a fraction of said acid(s), and repeating this additional process until all of said GNCC has been contacted with all of said acid(s).

Acid treatment and treatment with carbon dioxide can be carried out simultaneously and automatically takes place when acid is used. It is also possible to carry out an inventive acid treatment first, followed by treatment with carbon dioxide supplied from an external source.

Acid addition to GNCC may be performed dropwise or in one step. In the case of dropwise addition, this addition preferably takes place within a time period of 10 minutes. It is more preferred to add said acid in one step.

Preferred Embodiments Relative to Water-Soluble Salt

Following contacting said acid(s) of step b) with said GNCC of step a) during step d), at least one water-soluble salt, which in the case of a hydrogen-containing salt has a $pK_a$ of greater than 7, when measured at 20° C., associated with the ionisation of the first available hydrogen, and the salt anion of which is capable of forming water-insoluble calcium salts, is additionally provided.

The cation of said water-soluble salt is preferably selected from the group consisting of potassium, sodium, lithium and mixtures thereof. In a more preferred embodiment, said cation is sodium. It is of note that depending on the charge of the anion, more than one of said cations may be present to provide an electrically neutral ionic compound.

The anion of said water-soluble salt is preferably selected from the group consisting of phosphate, dihydrogen phosphate, monohydrogen phosphate, oxalate, silicate, mixtures thereof and hydrates thereof. In a more preferred embodiment, said anion is selected from the group consisting of phosphate, dihydrogen phosphate, monohydrogen phosphate, mixtures thereof and hydrates thereof. In a most preferred embodiment, said anion is selected from the group consisting of dihydrogen phosphate, monohydrogen phosphate, mixtures thereof and hydrates thereof.

Said anion of said water-soluble salt(s) is preferably dosed in a total amount corresponding to at least $5 \times 10^{-5}$ mol of anion/m² GNCC provided in step a). More preferably, said anion of said water-soluble salt(s) is dosed in a total amount corresponding to $5 \times 10^{-5}$ to $50 \times 10^{-5}$ mol of anion/m² GNCC provided in step a), and even more preferably in a total amount corresponding to $10 \times 10^{-5}$ to $30 \times 10^{-5}$ mol of anion/m² GNCC provided in step a).

Water-soluble salt addition may be performed dropwise or in one step. In the case of dropwise addition, this addition preferably takes place within a time period of 10 minutes. It is more preferred to add said salt in one step.

Reaction Environment

Step d) and addition of said water-soluble salt preferably take place in a stirred reactor under stirring conditions such as to develop an essentially laminar flow.

Step d) and addition of said water-soluble salt preferably take place in an aqueous environment having a temperature of above 50° C., and preferably of above 60° C.

Product Obtained from the Process

Subsequent to addition of said at least one water-soluble salt, the pH of the aqueous suspension, measured at 20° C., usually may reach a value of greater than 6.0, preferably greater than 6.5, more preferably greater than 7.0, even more preferably greater than 7.5. In other words, a surface-reacted calcium carbonate as an aqueous suspension having a pH of greater than 6.0, preferably greater than 6.5, more preferably greater than 7.0, even more preferably greater than 7.5 is obtained. If the aqueous suspension is allowed to reach equilibrium, the pH usually is greater than 7. A pH of greater than 6.0 may be adjusted without the addition of a base when stirring of the aqueous suspension is continued for a sufficient time period, preferably 1 hour to 10 hours, more preferably 1 to 5 hours.

Alternatively, prior to reaching an equilibrium state, which occurs at a pH greater than 7, the pH of the aqueous suspension may be increased to a value greater than 6 by adding a base subsequent to carbon dioxide treatment. Any conventional base such as sodium hydroxide or potassium hydroxide can be used.

The obtained surface-reacted calcium carbonate suspension may be concentrated, optionally up to the point of obtaining a dry surface-reacted calcium carbonate product. If the aqueous suspension described above is de-watered, the obtained solid (i.e. containing sufficiently little water so that it is not in a fluid form, or even no water) surface-reacted calcium carbonate may be in the form of a cake, granules or a powder. This solid product may additionally be treated with fatty acids or other hydrophobising/oleophilising agents. This solid product may be washed with water. Thus, a suspension of surface-reacted calcium carbonate is obtained, wherein said surface-reacted calcium carbonate comprises an insoluble, preferentially at least partially crystalline, calcium salt of anion(s) of said at least one water-soluble salt, which preferably extends from the surface of at least part of the calcium carbonate; provided in step a).

In a preferred embodiment, the surface-reacted calcium carbonate obtained by the inventive process has a specific surface area of more than 20 m$^2$/g, e.g. 20 m$^2$/g to 200 m$^2$/g, more preferably more than 30 m$^2$/g, e.g. 30 m$^2$/g to 150 m$^2$/g and even more preferably more than 80 m$^2$/g, measured according to the measurement method provided in the Examples section below.

In a preferred embodiment, the surface-reacted calcium carbonate has a specific BET surface area within the range of 20 to 150 m$^2$/g or 30 to 200 m$^2$/g and a median grain diameter within the range of 0.1 to 50 μm.

Furthermore, it is preferred that the surface-reacted calcium carbonate has a median grain diameter of from 0.1 to 50 μm, preferably of from 1 to 25 μm, more preferably of from 3 to 15 μm, even more preferably of from 5 to 12 μm as measured according to the measurement method provided in the Examples section below.

Preferably, the surface-reacted natural calcium carbonate has an intra-particle porosity within the range of 20% vol to 40% vol, measured by mercury porosimetry. Intra-particle porosity by mercury porosimetry is determined according to the following protocol: tablets are made from suspensions of the surface-reacted natural calcium carbonate by applying a constant pressure to the suspension for several hours such that water is released by filtration through a fine 0.025 μm filter membrane resulting in a compacted tablet of the pigment. The tablets are removed from the apparatus and dried in an oven at 80° C. for 24 hours. Once dried, single portions from each of the tablet blocks are characterised by mercury porosimetry for porosity and pore size distribution using a Micromeritics Autopore IV mercury porosimeter. The maximum applied pressure of mercury is 414 MPa, equivalent to a Laplace throat diameter of 0.004 μm (i.e. ~nm). The mercury intrusion measurements are corrected for the compression of mercury, expansion of the penetrometer and compressibility of the solid phase of the sample. The intra-particle pores have to be distinguished from the inter-particle pores. For this, the tablet structure has to be confirmed as being discretely separable in pore size distribution, i.e. of essentially non-overlapping size, such that inter and intra-particle pore sizes are distinguishable. Further details of the measuring method are described in *Transport in Porous Media* (2006) 63: 239-259.

The inventive surface-reacted calcium carbonate or a slurry of said surface-reacted calcium carbonate may be used in paper, tissue paper, plastics, paints, or as a controlled release or water treatment agent.

The surface-reacted calcium carbonate obtained by the process of the present invention is preferably brought into contact with water to be purified, e.g. industrial waste water, drinking water, urban waste water, waste water from breweries, or water in the paper industry, by any conventional means known to the skilled person. The surface-reacted calcium carbonate can be added as an aqueous suspension, e.g. the suspension described above. Alternatively, it can be added to the water to be purified in any appropriate solid form, e.g. in the form of granules or a powder or in the form of a cake.

The water may contain organic impurities, e.g. resulting from human waste, organic materials, soil, surfactants as well as inorganic impurities, in particular heavy metal impurities such as iron- or manganese-containing compounds. Harmful components that can be removed from the water with the purification process of the present invention also include microorganism such as bacteria, fungi, archaea, or protists.

The following examples are meant to illustrate the invention without restricting its scope.

EXAMPLES

Measurement Methods

The following measurement methods are used to evaluate the parameters given in the examples and claims.

Specific Surface Area (SSA) of a Material

The specific surface area is measured via the BET method according to ISO 9277 using nitrogen, following conditioning of the sample by heating at 250° C. for a period of 30 minutes. Prior to such measurements, the sample is filtered, rinsed and dried at 90-100° C. in an oven for at least 12 hours before being broken down in a mortar and pestle, and then placed in a mass balance at 130° C. until a constant weight is observed.

Particle Size Distribution (Mass % Particles with a Diameter<X) and Weight Median Grain Diameter ($d_{50}$) of Non-Surface Reacted Calcium Carbonate Particulate Material (ie. GNCC)

Weight median grain diameter and grain diameter mass distribution of a particulate material, such as GNCC, are determined via the sedimentation method, i.e. an analysis of sedimentation behaviour in a gravimetric field. The measurement is made with a Sedigraph™ 5120.

The method and the instrument are known to the skilled person and are commonly used to determine grain size of fillers and pigments. The measurement is carried out in an aqueous solution of 0.1 wt.-% $Na_4P_2O_7$. The samples were dispersed using a high speed stirrer and ultrasonic.

Median Grain Diameter ($d_{50}$) of Surface-Reacted Calcium Carbonate

Median grain diameter of surface-reacted calcium carbonate is determined using a Malvern Mastersizer 2000 Laser Diffraction System.

pH of an Aqueous Slurry

The pH of the aqueous suspension is measured using a standard pH-meter at approximately 25° C.

Solids Content of an Aqueous Slurry

The slurry solids content (also known as "dry weight") is determined using a Moisture Analyser HR73 commercialised by Mettler-Toledo with the following settings: temperature of 120° C., automatic switch off 3, standard drying, 5-20 g of slurry.

Example 1

The following Example is illustrative of the prior art, and involves contacting GNCC with phosphoric acid.

A calcium carbonate suspension is prepared by adding water and undispersed chalk (having a $d_{50}$ of 1 μm, wherein 90% of particles have a diameter of less than 2 μm (Sedigraph)) to a 20-L stainless steel reactor, such that the aqueous suspension obtained has a solids content corresponding to 16% by dry weight relative to the total suspension weight. The temperature of this suspension is thereafter brought to and maintained at 70° C.

Under stirring at approximately 1000 rpm such that an essentially laminar flow is established, phosphoric acid in the form a 10% solution is added to the calcium carbonate suspension through a peristaltic pump over a period of 10 minute in an amount corresponding to 10% by weight on dry calcium carbonate weight and approximately $3 \times 10^{-4}$ mol equivalent hydrogen/$m^2$ GNCC. Following this addition, $CO_2$ gas bubbles were observed to form and pass upwards through the suspension.

The suspension is stirred for an additional 5 minutes.

The resulting suspension is allowed to sit overnight. The product has an SSA=24.0 $m^2$/g and a $d_{50}$=3.5 μm (Malvern).

Example 2

The following Example is illustrative of the prior art, and involves contacting GNCC with phosphoric acid.

A calcium carbonate suspension is prepared by adding water and undispersed chalk (having a ($d_{50}$ of 3 μm, wherein 33% of particles have a diameter of less than 2 μm (Sedigraph)) to a 100-L stainless steel reactor, such that the aqueous suspension obtained has a solids content corresponding to 16% by dry weight relative to the total suspension weight. The temperature of this suspension is thereafter brought to and maintained at 70° C.

Under stirring at approximately 1000 rpm such that an essentially laminar flow is established, phosphoric acid in the form a 30% solution is added to the calcium carbonate suspension through a peristaltic pump over a period of 10 minute in an amount corresponding to 25% by weight on dry calcium carbonate weight and approximately $2.6 \times 10^{-4}$ mol equivalent hydrogen/$m^2$ GNCC. Following this addition, $CO_2$ gas bubbles were observed to form and pass upwards through the suspension.

The suspension is stirred for an additional 5 minutes.

The resulting suspension is allowed to sit overnight. The product has an SSA=34.5 $m^2$/g and a ($d_{50}$=7.9 μm (Malvern).

Example 3

The following Example is illustrative of the prior art, and involves contacting GNCC with phosphoric acid.

A calcium carbonate suspension is prepared by adding water and dispersed marble (having a $d_{50}$ of 0.7 μm, wherein 90% of particles have a diameter of less than 2 μm (Sedigraph)) in a 20-L stainless steel reactor, such that the aqueous suspension obtained has a solids content corresponding to 16% by dry weight relative to the total suspension weight. The temperature of this suspension is thereafter brought to and maintained at 70° C.

Under stirring at approximately 1000 rpm such that an essentially laminar flow is established, phosphoric acid in the form a 10% solution is added to the calcium carbonate suspension through a peristaltic pump over a period of 10 minute in an amount corresponding to 30% by weight on dry calcium carbonate weight and approximately $9 \times 10^{-4}$ mol equivalent hydrogen/$m^2$ GNCC. Following this addition, $CO_2$ gas bubbles were observed to form and pass upwards through the suspension.

The suspension is stirred for an additional 5 minutes.

The resulting suspension is allowed to sit overnight. The product has an SSA=35.0 $m^2$/g and a ($d_{50}$=3.9 μm (Malvern).

Example 4

The following Example is illustrative of the invention.

A calcium carbonate suspension is prepared by adding water and undispersed chalk (having a $d_{50}$ of 3 μm, wherein 33% of particles have a diameter of less than 2 μm (Sedigraph)) in a 20-L stainless steel reactor, such that the aqueous suspension obtained has a solids content corresponding to 16% by dry weight relative to the total suspension weight. The temperature of this suspension is thereafter brought to and maintained at 70° C.

Under stirring at approximately 1000 rpm such that an essentially laminar flow is established, acetic acid in the form a 50% solution is added to the calcium carbonate suspension through a separation funnel over a period of 1 minute in an amount corresponding to 18.4% by weight on dry calcium carbonate weight and $3 \times 10^{-4}$ mol equivalent hydrogen/$m^2$ GNCC. Following this addition, $CO_2$ gas bubbles were observed to form and pass upwards through the suspension.

Subsequently, $NaH_2PO_4 \cdot 2H_2O$ in the form of a 30% solution is added via a peristaltic pump to the calcium carbonate suspension over a period of 10 minutes in an amount corresponding to 47.8% by weight on dry calcium carbonate weight and $3 \times 10^{-4}$ mol $H_2PO_4$ anion/m² GNCC. Following this addition, the suspension is stirred for an additional 5 minutes.

The resulting suspension is allowed to sit overnight. The product has an SSA=72.4 m²/g and a $d_{50}$=7.1 µm (Malvern).

Example 5

The following Example is illustrative of the invention.

A calcium carbonate suspension is prepared by adding water and dispersed marble (having a ($d_{50}$ of 0.7 µm, wherein 90% of particles have a diameter of less than 2 µm) in a 20-L stainless steel reactor, such that the aqueous suspension obtained has a solids content corresponding to 16% by dry weight relative to the total suspension weight. The temperature of this suspension is thereafter brought to and maintained at 70° C.

Under stirring at approximately 1000 rpm such that an essentially laminar flow is established, acetic acid in the form a 50% solution is added to the calcium carbonate suspension through a separation funnel over a period of 1 minute in an amount corresponding to 18.4% by weight on dry calcium carbonate weight and $3 \times 10^{-4}$ mol equivalent hydrogen/m² GNCC. Following this addition, $CO_2$ gas bubbles were observed to form and pass upwards through the suspension.

Subsequently, $NaH_2PO_4 \cdot 2H_2O$ in the form of a 30% solution is added via a peristaltic pump to the calcium carbonate slurry over a period of 10 minutes in an amount corresponding to 47.8% by weight on dry calcium carbonate weight and $3 \times 10^{-4}$ mol $H_2PO_4$ anion/m² GNCC. Following this addition, the suspension is stirred for an additional 5 minutes.

The resulting suspension is allowed to sit overnight. The product has an SSA=81.6 m²/g and a $d_{50}$=6.8 µm (Malvern).

Example 6

The following Example is illustrative of the invention.

A calcium carbonate suspension is prepared by adding water and undispersed chalk (having a $d_{50}$ of 3 µm, wherein 33% of particles have a diameter of less than 2 µm (Sedigraph)) in a 20-L stainless steel reactor, such that the aqueous suspension obtained has a solids content corresponding to 16% by dry weight relative to the total suspension weight. The temperature of this suspension is thereafter brought to and maintained at 70° C.

Under stirring at approximately 1000 rpm such that an essentially laminar flow is established, acetic acid in the form a 50% solution is added to the calcium carbonate suspension through a separation funnel over a period of 1 minute in an amount corresponding to 36.8% by weight on dry calcium carbonate weight and $6 \times 10^{-4}$ mol equivalent hydrogen/m² GNCC. Following this addition, $CO_2$ gas bubbles were observed to form and pass upwards through the suspension.

Subsequently, $Na_2HPO_4$ in the form of a 30% solution/slurry is added via a peristaltic pump to the calcium carbonate suspension over a period of 10 minutes in an amount corresponding to 43.5% by weight on calcium carbonate weight and $3 \times 10^{-4}$ mol $HPO_4$ anion/m² GNCC. Following this addition, the suspension is stirred for an additional 5 minutes.

The resulting suspension is allowed to sit overnight. The product has an SSA=69.6 m²/g and a ($d_{50}$=7.5 µm (Malvern).

Example 7

The following Example is illustrative of the invention.

A calcium carbonate suspension is prepared by adding water and undispersed chalk (having a ($d_{50}$ of 3 µm, wherein 33% of particles have a diameter of less than 2 µm (Sedigraph)) in a 20-L stainless steel reactor, such that the aqueous suspension obtained has a solids content corresponding to 16% by dry weight relative to the total suspension weight. The temperature of this suspension is thereafter brought to and maintained at 70° C.

Under stirring at approximately 1000 rpm such that an essentially laminar flow is established, acetic acid in the form a 50% solution is added to the calcium carbonate suspension through a separation funnel over a period of 1 minute in an amount corresponding to 6.1% by weight on dry calcium carbonate weight and $1 \times 10^{-4}$ mol equivalent hydrogen/m² GNCC. Following this addition, $CO_2$ gas bubbles were observed to form and pass upwards through the suspension.

Subsequently, $NaH_2PO_4 \cdot 2H_2O$ in the form of a 30% solution is added via a peristaltic pump to the calcium carbonate slurry over a period of 10 minutes in an amount corresponding to 15.9% by weight on calcium carbonate weight and $1 \times 10^{-4}$ mol $H_2PO_4$ anion/m² GNCC. Following this addition, the suspension is stirred for an additional 5 minutes.

The resulting suspension is allowed to sit overnight. The product has an SSA=33.5 m²/g and a $d_{50}$=6.0 µm (Malvern).

TABLE 1**

| Example | 1 | 2 | 3 | 4 | 5 | 6 | 7 |
|---|---|---|---|---|---|---|---|
| Prior art (PA)/ invention (IN) | PA | PA | PA | IN | IN | IN | IN |
| Acid | $H_3PO_4$ | $H_3PO_4$ | $H_3PO_4$ | $CH_3COOH$ | $CH_3COOH$ | $CH_3COOH$ | $CH_3COOH$ |
| TLV | <1 ppm | <1 ppm | <1 ppm | 10 ppm | 10 ppm | 10 ppm | 10 ppm |
| pKa | 2.12 | 2.12 | 2.12 | 4.76 | 4.76 | 4.76 | 4.76 |
| Amount acid added | $3 \times 10^{-4}$ mol | $2.6 \times 10^{-4}$ mol | $9 \times 10^{-4}$ mol | $3 \times 10^{-4}$ mol | $3 \times 10^{-4}$ mol | $6 \times 10^{-4}$ mol | $1 \times 10^{-4}$ mol |
| Water-soluble salt | none | none | none | $NaH_2PO_4 \cdot 2H_2O$ | $NaH_2PO_4 \cdot 2H_2O$ | $Na_2HPO_4$ | $NaH_2PO_4 \cdot 2H_2O$ |

TABLE 1**-continued

| Example | 1 | 2 | 3 | 4 | 5 | 6 | 7 |
|---|---|---|---|---|---|---|---|
| Amount salt added | n/a | n/a | n/a | $3 \times 10^{-4}$ mol | $3 \times 10^{-4}$ mol | $3 \times 10^{-4}$ mol | $1 \times 10^{-4}$ mol |
| Total equivalent H atoms added*** | $3 \times 10^{-4}$ mol | $7.7 \times 10^{-4}$ mol | $9 \times 10^{-4}$ mol | $9 \times 10^{-4}$ mol | $9 \times 10^{-4}$ mol | $9 \times 10^{-4}$ mol | $3 \times 10^{-4}$ mol |
| SSA of final product (m²/g) | 24.0 | 34.5 | 35.0 | 72.4 | 81.6 | 69.6 | 33.5 |

**all amounts acid are given in mol equivalent hydrogen/m² GNCC and all amounts salt are given in mol corresponding anion/m² GNCC
***equivalent hydrogen atoms in all of the acid and salt added to GNCC in mol equivalent hydrogen/m² GNCC

The invention claimed is:

1. A process for preparing a surface-reacted calcium carbonate in an aqueous environment comprising the following steps:
   a) providing at least one ground natural calcium carbonate (GNCC);
   b) providing at least one water-soluble acid;
   c) providing gaseous $CO_2$;
   d) contacting the GNCC of step a) with the acid of step b) and with the $CO_2$ of step c);
wherein:
   (i) the at least one acid of step b) has a $pK_a$ of greater than 2.5 and less than or equal to 7, when measured at 20° C., and is associated with the ionisation of the first available hydrogen, and a corresponding anion formed on loss of the first available hydrogen that is capable of forming water-soluble calcium salts;
   (ii) following contacting the at least one acid with the GNCC, at least one water-soluble salt is additionally added, wherein the water-soluble salt is a hydrogen-containing salt having a $pK_a$ of greater than 7, when measured at 20° C., and is associated with the ionisation of the first available hydrogen, and a salt anion of which is capable of forming water-insoluble calcium salts.

2. The process according to claim 1, wherein the GNCC comprises marble, chalk, calcite, dolomite, limestone, or any mixture thereof.

3. The process according to claim 1, wherein the GNCC of step a) has a weight median diameter of 0.01 to 10 μm.

4. The process according to claim 1, wherein the GNCC of step a) has a weight median diameter of 0.5 to 2 μm.

5. The process according to claim 1, wherein the GNCC is provided in the form of an aqueous GNCC suspension.

6. The process according to claim 5, wherein the suspension has a pH of less than 11.

7. The process according to claim 5, wherein the suspension has a pH of less than 10.5.

8. The process according to claim 5, wherein the suspension has a solids content of greater than or equal to 10 wt.-%, based on the weight of the suspension.

9. The process according to claim 5, wherein the suspension has a solids content of 10 wt.-% and 80 wt.-%, based on the weight of the suspension.

10. The process according to claim 5, wherein the suspension has a solids content of 16 wt.-% and 60 wt.-%, based on the weight of the suspension.

11. The process according to claim 5, wherein the suspension has a solids content of 16 wt.-% and 40 wt.-%, based on the weight of the suspension.

12. The process according to claim 5, wherein the suspension is stabilized by the addition of dispersants.

13. The process according to claim 1, wherein the at least one water-soluble acid of step b) has a pKa of between 2.6 and 5.

14. The process according to claim 1, wherein the at least one water-soluble acid is acetic acid, formic acid, propanoic acid or any mixture thereof.

15. The process according to claim 1, wherein the at least one water-soluble acid is acetic acid, formic acid, or any mixture thereof.

16. The process according to claim 1, wherein the at least one water-soluble acid is acetic acid.

17. The process according to claim 1, wherein the at least one water-soluble acid is dosed in a total amount corresponding to at least $1.5 \times 10^{-4}$ mol of hydrogen atoms in the acid/m² GNCC provided in step a).

18. The process according to claim 1, wherein the at least one water-soluble acid is dosed in a total amount corresponding to from $2 \times 10^{-4}$ to $12 \times 10^{-4}$ mol of hydrogen atoms in the acid/m² GNCC provided in step a).

19. The process according to claim 1, wherein the at least one water-soluble acid is dosed in a total amount corresponding to from $3 \times 10^{-4}$ to $10 \times 10^{-4}$ mol of hydrogen atoms in the acid/m² GNCC provided in step a).

20. The process according to claim 1, wherein the at least one water-soluble acid of step b) is dosed in a total amount corresponding to 5 to 40 wt.-% equivalent pure acid based on the dry weight of GNCC provided in step a).

21. The process according to claim 1, wherein the at least one water-soluble acid of step b) is dosed in a total amount corresponding to 10 to 30 wt.-% equivalent pure acid based on the dry weight of GNCC provided in step a).

22. The process according to claim 1, wherein the at least one water-soluble acid of step b) is dosed in a total amount corresponding to 15 to 25 wt.-% equivalent pure acid based on the dry weight of GNCC provided in step a).

23. The process according to claim 1, wherein the at least one water-soluble acid of step b) is provided in the form of an aqueous solution having an acid concentration, determined as the equivalent weight of pure acid on the weight of the total solution, corresponding to from 25 to 75%.

24. The process according to claim 1, wherein the at least one water-soluble acid of step b) is provided in the form of an aqueous solution having an acid concentration, determined as the equivalent weight of pure acid on the weight of the total solution, corresponding to from 40 to 60%.

25. The process according to claim 1, wherein during step d), the at least one acid of step b) is added, in one or more steps, to the GNCC.

26. The process according to claim 1, wherein the cation of the at least one water-soluble salt is selected from the group consisting of potassium, sodium, lithium, and any mixture thereof.

27. The process according to claim 1, wherein the cation of the at least one water-soluble salt is sodium.

28. The process according to claim 1, wherein the anion of the at least one water-soluble salt is selected from the group consisting of, dihydrogen phosphate, monohydrogen phosphate, hydrates of oxalate, hydrates of silicate, and any mixture thereof.

29. The process according to claim 1, wherein the anion of the at least one water-soluble salt is selected from the group consisting of phosphate, dihydrogen phosphate, monohydrogen phosphate, hydrates thereof, and any mixture thereof.

30. The process according to claim 1, wherein the anion of the at least one water-soluble salt is dosed in a total amount corresponding to at least $5\times10^{-5}$ mol of anion/$m^2$ GNCC provided in step a).

31. The process according to claim 1, wherein the anion of the at least one water-soluble salt is dosed in a total amount corresponding to $5\times10^{-5}$ to $50\times10^{-5}$ mol of anion/$m^2$ GNCC provided in step a).

32. The process according to claim 1, wherein the anion of the at least one water-soluble salt is dosed in a total amount corresponding to $10\times10^{-5}$ to $30\times10^{-5}$ mol of anion/$m^2$ GNCC provided in step a).

33. The process according to claim 1, wherein the at least one water soluble salt is added in one step.

34. The process according to claim 1, wherein in step d) the addition of the at least one water-soluble salt take place in a stirred reactor under stirring conditions such as to develop a laminar flow.

35. The process according to claim 1, wherein in step d) the addition of the at least one water-soluble salt takes place in an aqueous environment having a temperature of above 50° C.

36. The process according to claim 1, wherein in step d) the addition of the at least one water-soluble salt takes place in an aqueous environment having a temperature of above 60° C.

37. The process according to claim 1, wherein the aqueous suspension is concentrated following step d).

* * * * *